Patented July 14, 1936

2,047,457

UNITED STATES PATENT OFFICE 2,047,457

SILICA REFRACTORY ARTICLES AND METHOD OF MAKING SAME

Raymond C. Benner, Henry N. Baumann, Jr., and George J. Easter, Niagara Falls, N. Y., assignors to The Carborundum Company, Niagara Falls, N. Y., a corporation of Pennsylvania No Drawing. Application March 2, 1933, Serial No. 659,348

2 Claims. (Cl. 106—9)

This invention relates to improved refractory articles made from silica and particularly to refractory articles made from bonded pre-fused silica, and to the process of making the same.

The articles made by the new method show a remarkable toughness, elasticity and stability of crystal form which overcome the characteristic weakness of silica ware as ordinarily found in respect to thermal shock.

The usual bond heretofore employed in making silica refractories is lime, incorporated with the silica as milk of lime. The mass resulting is non-plastic, fragile and difficult to mold. The action of the lime is to form a calcium silicate under heat which tends to hold the particles of silica together. Other bonds employed with sicila brick are usually clays and as in the case of lime they form silicates which hold the silica grains in a more or less secure manner. However, if a large amount of clay is employed to give a strong body the desired properties of the silica are lost and the brick lose their outstanding refractory value. At the same time the bond developed is a haphazard one due to the mixtures employed and the results cannot be predicted or controlled satisfactorily.

Our new process consists essentially in mixing crushed fused silica (carefully graded to give a minimum of voids) with finely divided alumina and fabricating the same. The crushing of the silica may be carried on in such a way as to give a grit mixture with a minimum of voids or the material may be sorted into various sizes and recombined in the manner used in making concrete mixtures to obtain a minimum of voids. The alumina may be one of the purer forms and may be added as such, or may be precipitated in place by chemical action from solutions of the aluminum salts.

The function of the alumina is to bond the silica particles; and it is desirable to bring the alumina into intimate contact with the surfaces of the silica particles. This is especially true as the preferred method of firing the refractory articles is to cure them at a temperature below the point where a mixture of silica with alumina fluxes to form a liquid glass. At the curing temperature employed, there is a reaction however between the surfaces of the silica particles and the finely divided alumina contacting with the surfaces. In speaking of "finely divided" alumina therefore we mean that the particle size is relatively so small that a large number of particles contact the surface of each grain of silica which is to retain its identity in the finished article. (Obviously some of the silica will be present as "fines" which may be of a particle size so small as to disappear in the matrix of the finished article.) For example, where a refractory brick is to be produced, a mixture of grain sizes is selected, the large particles giving good refractory properties to the article and the small sizes giving strength to the article. For such a brick the particles of alumina should pass through a 200 mesh screen. One method which has been employed is to use finely divided alumina which appears in the trade under the name "levigated" alumina. This alumina is approximately 99% $Al_2O_3$ and has a fineness such that the majority of it will pass a 400 mesh silk screen. To obtain finely divided alumina of this degree of purity, bauxite ore is usually treated with an aqueous solution of sodium hydroxide at a temperature of about 150° C. Sodium aluminate is formed which is separated from solid materials and run into decomposing tanks. The aluminum hydroxide precipitates for a period of several days. The aluminum hydroxide is separated from the solution, dried, calcined and crushed. The principal impurities are water, silica and sodium oxide. The water and the silica are unimportant impurities for the present purpose. The sodium oxide can by careful manipulation be reduced to less than half of one percent of the alumina, and should be kept as low as possible due to its fluxing nature.

The fused silica may be the product which appears on the market as "fused silica sand", "fused quartz" or similar material. A more technically correct term for this material is vitreous silica. The silica content will normally run well over 98%. The material should be a well fused glass free from unfused materials or products of reduction but does not need to be clear or free from all coloration and blow holes. The fused silica as it appears on the market is a glass with traces of silicon, iron and carbon present. The impurities appear from the raw materials used or from contamination during the fusion. The glass is the amorphous, vitreous form of silica with a density about 2.21 and an index of refraction of 1.458 for sodium light.

The action of the alumina as it bonds the silica is believed to be dependent on the formation of eutectic material of the composition 95.5% $SiO_2$, 4.5% $Al_2O_3$. This eutectic has a melting point of approximately 1545° C. The development of the eutectic composition can be accomplished within the range of ordinary fuel fired furnaces and allows an economical operation in firing. The amount of alumina employed may be calculated to fully combine with the silica present. However, if the amount is either in excess or is deficient the resulting product is more refractory than otherwise and small variations will not spoil the operation of the process.

In carrying out our invention, the fused silica and the alumina are mixed to give a uniform composition and are then molded into such forms as may be required. As is customary, a temporary binder may be employed to facilitate the molding. One which we find useful is dextrine which is added in powder form to the dry mix and the whole mass tempered with water. Molding may be by any convenient method such as by tamping, jolting or by forming under pressure.

Although compositions containing from one to ten percent by weight of alumina have been found to yield satisfactory bodies, we will described by way of illustration the making of pieces containing five percent of alumina. The fused silica is selected to exclude any material amounts of unfused material and is crushed to the desired size. In the case in question, we use a mixture of equal weights of material (a) passed through a 4 mesh screen, and (b) ball milled through 200 mesh. To this mixture we add 5 percent by weight of levigated alumina and 2 percent of powdered sulfite pitch. After thoroughly mixing these ingredients dry, water is added to temper the mix to a consistency suitable for dry pressing or tamping. The material is then molded by tamping in molds or by pressing under pressures of 2000 pounds per square inch or more. The molded pieces are removed from the mold, dried and burned in the usual manner well known to makers of refractories.

This procedure and mix are cited only as an example and material variations from either may be made, for instance all the materials may be finely powdered and molding done by extrusion or by casting. Also as noted above the percentage of alumina may be varied from one to ten and even higher. Additional material such as 10% of bentonite slip may also be used to impart plasticity to the mix during molding.

The moulded ware is dried and then heated gradually to a temperature sufficient to cause the mass to knit together and form a hard strong body. A considerable range of temperatures may be used for firing, varying from perhaps 1350° C. up to 1500° C. We have found, however, that burning at 1450° C. for 12 hours gives a very satisfactory structure. After such burning, the structure is such that the individual grains appear to coalesce and when the ware is broken the fracture shows broken grains as well as bond.

Photomicrographs of pieces containing 95% silica bonded with 5% alumina indicate that the particles of silica are almost completely converted into one of the crystalline forms, apparently crystobalite, in the burning operation, but are combined with the alumina at their surfaces to form an isotropic bond in which the alumina is no longer distinguishable as such.

Due to the coarse size of the silica granules in comparison with the alumina bond, the entire mass of silica does not enter into the formation of the eutectic so that the brick consists of silica particles with a bond comprising excess alumina in a glass corresponding approximately to the alumina-silica eutectic.

Our silica brick retain the advantages which are ordinarily considered as characteristic of silica brick, but possess in addition very greatly increased ability to resist spalling. In a test, for instance, where ordinary silica brick were repeatedly heated to 1350° C. and cooled rapidly in a blast of air, it was found that they completely disintegrated after two such treatments. Our new brick, on the contrary, withstood twenty such quenchings without any loss in weight and without serious cracking. We are not able to explain the reason for this exceptional resistance to spalling, as the volume changes in crystobalite (which appears to constitute the majority of our new product) are very sudden and rather large. Perhaps the bond is sufficiently elastic to accommodate these volume changes without fracture. At any rate the greatly increased spalling resistance is a demonstrated fact and gives the ware a marked advantage over ordinary silica brick.

It has also been found that the ware made according to this method has a remarkably tough strong nature and will withstand considerable mechanical abuse while the previous silica refractories are normally brittle and easily broken. Also due to the fact that our brick shows none of the permanent growth characteristic of ordinary silica brick in service, furnaces built from refractories made under our process do not need to be equipped with devices to compensate for such volume changes, thus resulting in a simpler and more stable type of construction.

The refractory ware made by the improved process retains the desirable properties of previous silica refractories and overcomes the objectionable features which now prevent their widespread usage. The presence of the eutectic material in the mass does not greatly restrict the use of the product for high temperatures, as its fusion point is well above the temperatures which the bulk of furnace walls will reach in service.

Having now described our refractories and the process of making them, what we claim as new and novel and on which we desire to receive Letters Patent is as follows:

1. The process of making refractories which comprises forming a mass from a mixture of relatively coarse particles of vitreous silica and levigated alumina, and firing the mass at a temperature between 1350 and 1500° C. to convert it principally into particles of crystalline silica combined with alumina at their surfaces only, whereby the mass is bonded together.

2. A refractory article made by molding grains of vitreous silica with a binder composed of approximately five percent of levigated alumina and curing at a temperature between 1350° and 1500° C.

RAYMOND C. BENNER.
HENRY N. BAUMANN, Jr.
GEORGE J. EASTER.